United States Patent
Maroschak et al.

(10) Patent No.: US 9,958,091 B1
(45) Date of Patent: May 1, 2018

(54) PIPE WITH EMBEDDED WIRE

(71) Applicant: Advanced Drainage Systems, Inc., Hilliard, OH (US)

(72) Inventors: Michael Maroschak, Orlando, FL (US); Douglas Everson, Orlando, FL (US)

(73) Assignee: Advanced Drainage Systems, Inc., Hilliard, OH (US)

( * ) Notice: Subject to any disclaimer, the term of this patent is extended or adjusted under 35 U.S.C. 154(b) by 0 days. days.

(21) Appl. No.: 15/239,108

(22) Filed: Aug. 17, 2016

Related U.S. Application Data (62) Division of application No. 14/208,710, filed on Mar. 13, 2014, now abandoned.

(60) Provisional application No. 61/787,264, filed on Mar. 15, 2013.

(51) Int. Cl.
| | |
|---|---|
| *F16L 11/127* | (2006.01) |
| *B29C 37/00* | (2006.01) |
| *B29B 11/10* | (2006.01) |
| *F16L 11/15* | (2006.01) |
| *B29K 705/00* | (2006.01) |
| *B29L 23/00* | (2006.01) |

(52) U.S. Cl.
CPC ............. *F16L 11/127* (2013.01); *B29B 11/10* (2013.01); *B29C 37/0053* (2013.01); *F16L 11/15* (2013.01); *B29K 2023/06* (2013.01); *B29K 2705/00* (2013.01); *B29K 2995/0005* (2013.01); *B29L 2023/22* (2013.01)

(58) Field of Classification Search
CPC ..... F16L 11/127; F16L 11/15; B29C 37/0053; B29B 11/10; B29L 2023/22; B29K 2023/06; B29K 2705/00; B29K 2995/0005

USPC ........................................................ 264/279.1
See application file for complete search history.

(56) References Cited

U.S. PATENT DOCUMENTS

| | | | |
|---|---|---|---|
| 3,058,493 A | 10/1962 | Muller | |
| 3,080,891 A * | 3/1963 | Duff ....................... | B29D 23/18 138/122 |
| 3,715,454 A | 2/1973 | Kleykamp | |
| 3,747,352 A | 7/1973 | Maroschak | |
| 3,784,346 A | 1/1974 | Maroschak | |
| 3,789,615 A | 2/1974 | Maroschak | |

(Continued)

FOREIGN PATENT DOCUMENTS

| | | |
|---|---|---|
| GB | 2056285 | 8/1980 |
| JP | 61172720 A | 1/1985 |

(Continued)

OTHER PUBLICATIONS

American National Standard, Standard Specification for Steel Reinforced Polyethylene (PE) Corrugated Pipe; ASTM International, Designation F2435-12; pp. 1-8; ASTM International, West Conshohocken, PA.

*Primary Examiner* — Donnell Long
(74) *Attorney, Agent, or Firm* — Finnegan, Henderson, Farabow, Garrett & Dunner LLP (57) ABSTRACT

A corrugated pipe includes a corrugated pipe body circumscribing a hollow conduit and including alternating ribs and valleys extending along a longitudinal axis between a first end and a second end thereof. An electrically conductive wire is embedded in the corrugated pipe body, so that the wire spans adjacent ribs and valleys and extends substantially parallel to the longitudinal axis between the first and second ends.

16 Claims, 5 Drawing Sheets

(56) References Cited

U.S. PATENT DOCUMENTS

| | | | |
|---|---|---|---|
| 3,792,941 | A | 2/1974 | Maroschak |
| 3,799,418 | A | 3/1974 | Maroschak |
| 3,802,202 | A | 4/1974 | Maroschak |
| 3,825,288 | A | 7/1974 | Maroschak |
| 3,831,470 | A | 8/1974 | Maroschak |
| 3,832,855 | A | 9/1974 | Maroschak |
| 3,843,758 | A | 10/1974 | Maroschak |
| 3,854,527 | A | 12/1974 | Maroschak |
| 3,861,152 | A | 1/1975 | Maroschak |
| 3,861,153 | A | 1/1975 | Maroschak |
| 3,864,446 | A | 2/1975 | Maroschak |
| 3,870,774 | A | 3/1975 | Maroschak |
| 3,877,831 | A | 4/1975 | Maroschak |
| D235,100 | S | 5/1975 | Maroschak |
| D235,101 | S | 5/1975 | Maroschak |
| D235,102 | S | 5/1975 | Maroschak |
| D235,103 | S | 5/1975 | Maroschak |
| D235,104 | S | 5/1975 | Maroschak |
| 3,891,733 | A | 6/1975 | Maroschak |
| 3,897,090 | A | 7/1975 | Maroschak |
| 3,899,198 | A | 8/1975 | Maroschak |
| 3,904,228 | A | 9/1975 | Maroschak |
| 3,910,713 | A | 10/1975 | Maroschak |
| 3,916,763 | A | 11/1975 | Maroschak |
| 3,919,367 | A | 11/1975 | Maroschak |
| 3,941,639 | A | 3/1976 | Maroschak |
| 3,958,425 | A | 5/1976 | Maroschak |
| 3,986,963 | A | 10/1976 | Maroschak |
| 3,990,827 | A | 11/1976 | Maroschak |
| 4,003,685 | A | 1/1977 | Maroschak |
| 4,064,355 | A * | 12/1977 | Neroni ............... A47L 9/24 138/115 |
| 4,140,422 | A | 2/1979 | Crumpler, Jr. et al. |
| 4,194,081 | A | 3/1980 | Medford |
| 4,312,383 | A | 1/1982 | Kelykamp |
| 4,669,508 | A | 6/1987 | Neaves |
| 4,681,684 | A | 7/1987 | Maroschak et al. |
| 4,698,890 | A | 10/1987 | Neaves |
| 5,039,011 | A | 8/1991 | Parker |
| 5,516,229 | A | 5/1996 | Atchley et al. |
| 5,520,481 | A | 5/1996 | Atchley et al. |
| 5,606,786 | A | 3/1997 | Presby |
| 5,944,059 | A | 8/1999 | Masui |
| 6,164,338 | A | 12/2000 | Holzer et al. |
| 6,461,078 | B1 | 10/2002 | Presby |
| 6,659,135 | B2 * | 12/2003 | Sorkin ............... E04C 5/10 138/121 |
| 6,889,714 | B1 * | 5/2005 | Sorkin ............... E04C 5/10 138/110 |
| 7,661,903 | B1 | 2/2010 | Maroschak et al. |
| 7,717,138 | B2 | 5/2010 | Takagi |
| 7,891,382 | B2 | 2/2011 | Rushlander et al. |
| 2008/0245434 | A1 | 10/2008 | Hibino et al. |
| 2011/0139288 | A1 | 6/2011 | Rushlander et al. |
| 2011/0277866 | A1 | 11/2011 | Downing et al. |
| 2012/0240404 | A1 | 9/2012 | Hibino et al. |

FOREIGN PATENT DOCUMENTS

| | | |
|---|---|---|
| JP | 2894044 B2 | 9/1991 |
| JP | 09253030 A | 8/1996 |
| JP | 2006083608 A | 9/2004 |
| JP | 2010166789 A | 1/2009 |

* cited by examiner

PIPE WITH EMBEDDED WIRE

CROSS-REFERENCE TO RELATED APPLICATION

This application is a divisional of U.S. patent application Ser. No. 14/208,710 filed on Mar. 13, 2014, which claims the benefit of U.S. Provisional Application Ser. No. 61/787,264, filed Mar. 15, 2013, the contents of which applications are herein incorporated by reference in their entirety.

FIELD OF THE INVENTION

The invention relates to the field of pipes and, more particularly, to corrugated pipes.

BACKGROUND OF THE INVENTION

Modern corrugated polyethylene pipe is a versatile product, in part, because it is relatively lightweight. This allows it to be transported and installed more cheaply and easily than comparable rigid plastic, metal, or concrete pipe. Corrugated polyethylene pipe is routinely used to transfer air or solid particulate material and is primarily used in gravity flow water management systems, examples of which include stormwater drainage, subsurface drainage, sewage, leachate collection, rainwater harvesting, and stormwater retention systems.

The lightweight construction of corrugated polyethylene pipe, however, has a particular drawback; namely, it is flexible. Due to this flexibility, it may deform substantially when it is buried underground in areas that receive heavy vehicle or foot traffic. It may also break. But since the corrugated pipes are often buried underground, they are difficult to locate if they need to repaired or moved. Often, the terrain needs to be excavated just to locate the pipes.

SUMMARY OF THE INVENTION

We realized that what is needed to solve this problem is a corrugated pipe that can be detected from above ground and without substantial excavation. Such a corrugated pipe includes an electrically conductive wire embedded therein. The wire extends substantially parallel to the longitudinal axis of the pipe. This advantageously allows a worker to locate the pipe using a conventional metal detector.

A corrugated pipe embodying these principles includes a corrugated pipe body circumscribing a hollow conduit and including alternating ribs and valleys extending along a longitudinal axis between a first end and a second end thereof. An electrically conductive wire is embedded in the corrugated pipe body, so that the wire spans adjacent ribs and valleys and extends substantially parallel to the longitudinal axis between the first and second ends.

A method of embedding wire in corrugated pipe includes introducing an extruded tube of resilient material into a molding apparatus having a plurality of cooperating mold members; inserting electrically conductive wire into the molding apparatus with the extruded tube; and molding corrugations into the extruded tube while simultaneously embedding the wire into the resilient material by contacting the tube and wire with the mold members. This forms a corrugated pipe with the wire embedded in a corrugated body thereof.

A wire embedding system includes an extruder having an extrusion die head that extrudes tubular material from an output end thereof. A wire feed device including a hollow shaft receives a continuous length of wire, feeds the wire through the shaft to an opening in the shaft adjacent the output end, and deposits the wire from the opening onto to the extruded tubular material. A molding apparatus receives the extruded tubular material and deposited wire and molds the deposited wire into the extruded tubular material.

DETAILED DESCRIPTION OF PREFERRED EMBODIMENTS

In the Summary and in the Detailed Description of The Embodiments, reference is made to particular features. Where a particular feature is disclosed in the context of a particular aspect or embodiment, that feature can also be used, to the extent possible, in combination with and/or in the context of other aspects and embodiments.

Figure 1:
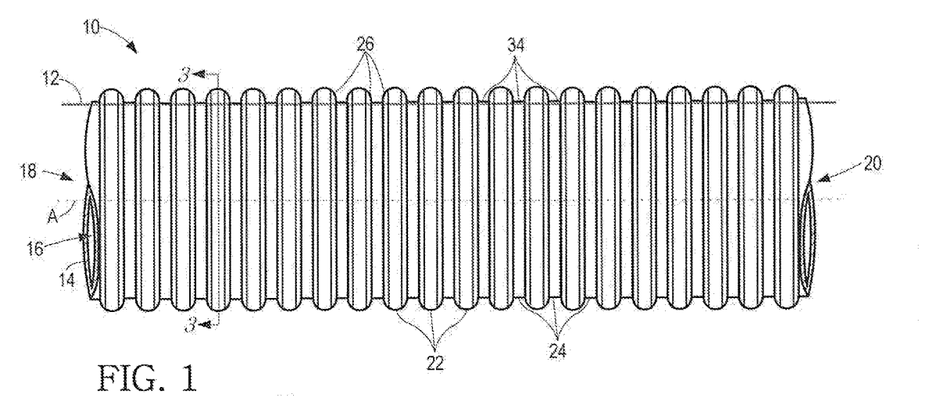
FIG. 1 is a side view of an exemplary corrugated pipe with an embedded wire.
Figure 2:
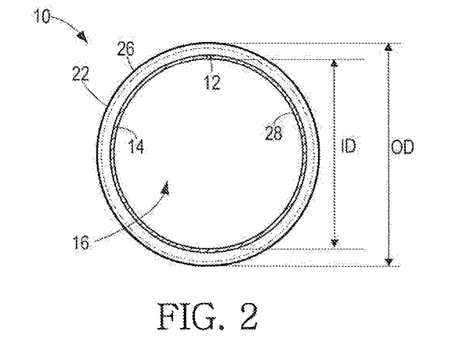
FIG. 2 is a front view of the pipe of FIG. 1.
Figure 3:
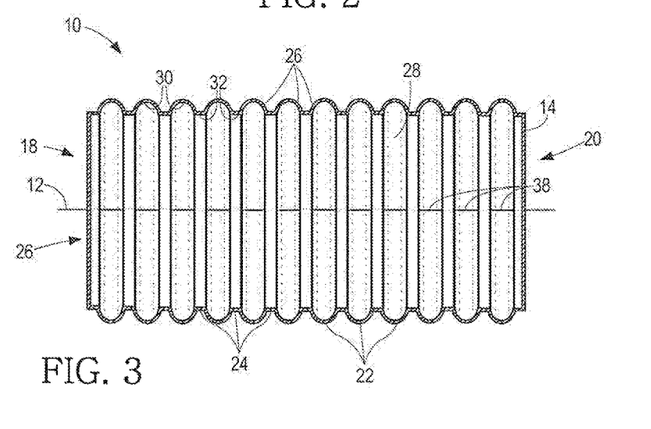
FIG. 3 is a longitudinal cutaway view of the pipe of FIG. 1.

Referring to FIGS. 1-3, an exemplary embodiment of the corrugated pipe 10 having a wire 12 embedded therein is generally shown.

The pipe 10 includes a corrugated pipe body 14 circumscribing a hollow conduit 16 extending along a longitudinal axis A of the pipe 10 between a first end 18 and a second end 20 thereof. The pipe body 14 includes annular corrugations formed by alternating and successive ribs 22 and valleys 24 that are interconnected by corrugation side walls 26. The ribs 22 are wider than the valleys 24. The corrugation side walls 26 are tapered and lie in a plane slightly inclined from vertical.

The ribs 22 and valleys 24 are arranged on the outer surface of the pipe body 14, but define a corresponding corrugated interior pipe surface, 28, which is best shown in FIG. 3. On the corrugated interior pipe surface 28, the ribs 22 define interior valleys 30 and the valleys 24 define interior ribs 32.

The pipe body 14 is preferably made of moldable resilient material. Such moldable resilient material includes various moldable polymers, rubbers, or plastics, including, but not limited to, polyethylene.

As shown in FIG. 2, the pipe 10 includes an inner diameter ID and an outer diameter OD. The inner diameter ID is defined by the distance between diametrically opposing sides of the interior ribs 32. The outer diameter OD is defined by the distance between diametrically opposing sides of the ribs 22. The difference between the outer diameter OD and the inner diameter ID is the thickness of the pipe 10.

The wire 12 is made of electrically conductive material, preferably metal. Suitable metal wiring includes steel, stainless steel, and copper. Stainless steel wire is particularly preferred because it can withstand a substantial amount of force before breaking and does not oxidize very quickly when buried in the ground.

In the embodiment shown, the wire 12 is embedded in the pipe body 14 and positioned between the pipe's inside diameter ID and outside diameter OD. The wire 12 extends lengthwise along the pipe 10 substantially parallel to the pipe's longitudinal axis A. The wire 12 bisects the ribs 22 and valleys 24 and lies below the apex of the ribs 22 and is at least partially embedded in the portion of the pipe body 14 that forms the valley floors 34 so as to be substantially co-planar with the exterior annular surface of the valleys floors 34.

On the interior of the pipe 10, as best shown in FIG. 3, the wire 12 is within in a ridge 38 of the material forming the pipe body 14. The ridge 38 extends the same direction as the wire 12 and is formed when the wire is pushed into pipe body 14 during molding. Accordingly, the ridge 38 substantially encapsulates the wire 12 on the interior of the pipe 10. The wire 12 itself, within the ridge 38, bisects the apex of the interior ribs 32. The distance the ridge 38 extends outwardly from the interior surface of the pipe 10 at the interior valleys 30 is substantially consistent along the length of the pipe 10.

The ridge 38 forms an elongated protrusion within the interior valleys 30 that runs perpendicular to the interior valley's 30 annular surface. The apex of the ridge 38 extends slightly above the apex of the interior ribs 32 to accommodate the pipe body 14 material having the wire 12 embedded therein.

The wire may serve several important functions, depending on where the pipe 10 is used. One of the intended uses for the pipe is for moving and storing water underground. When the pipe 10 is buried, the wire 12 allows the pipe 10 to be detectable with a metal detector. The pipe 10 is detectable along its entire length, meaning that a worker can, not only locate the pipe 10, but also identify where it begins and ends. Accordingly, if the pipe 10 ever needs to be removed, repaired, or inspected, only a minimal amount of excavation is required. Applying electricity to the wire provides a means to assess whether the pipe is broken via a loss of conductivity.

Also, the wire 12 may be used to electrically couple the pipe 10 to the ground to dissipate static electricity that may build as material flows through the pipe 10.

Further, the wire may provide a means for heating the pipe or its contents and may be used to improve upon air and heat transfer for cooling applications.

Embodiments of the pipe 10 are not limited to including a single wire 12. Additional wires 12 may be arranged, for example, to be radially spaced about the pipe body 14. In a particular embodiment, for example, three wires 12 are radially spaced about the longitudinal axis A of the pipe 10 and extend generally parallel thereto as was the case with the embodiment shown.

Embodiments of the pipe 10 are not limited to single wall corrugated pipe, which is used an illustrative example. Double or triple wall corrugated pipe may also include at least one of the embedded wires 12.

The size of the pipe 10 may be adapted for its intended use, in particular, the volume of material the pipe is intended to handle. Accordingly, embodiments of the pipe 10 are not limited to any particular size. In some typical embodiments, however, the inner diameter is one of the standard diameters for corrugated polyethylene pipe. Suitable inner diameters ID include, but are not limited to, about 2 inches to about 12 inches.

Figure 4:
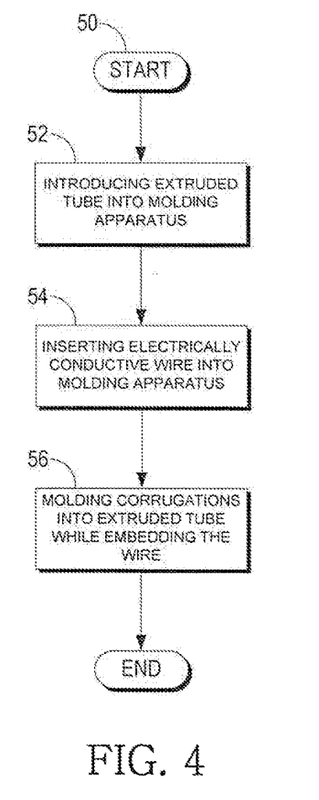
FIG. 4 is flow diagram illustrating a method of embedding wire in corrugated pipe.

Referring now to FIG. 4, a method of embedding wire in corrugated pipe begins at Block 50. The method includes introducing an extruded tube of plastic material into a molding apparatus having a plurality of cooperating mold members (Block 52). At Block 54, electrically conductive wire is inserted into the molding apparatus with the extruded tube. At Block 56, corrugations are molded into the extruded tube while the wire is simultaneously embedded into the plastic material by contacting the tube and wire with the mold members. The result of this molding operation is a corrugated pipe with the wire embedded in a corrugated body thereof, such as the pipe 10 described above.

Figure 5:
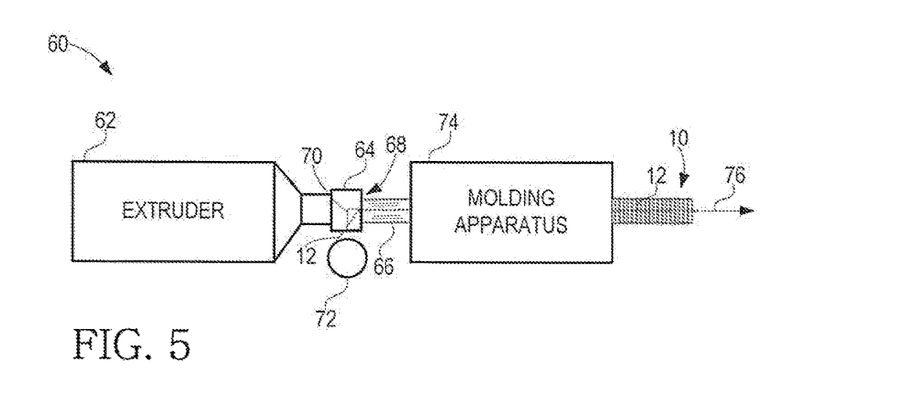
FIG. 5 is a diagram of a wire embedding system.

A wire embedding apparatus 60 capable of carrying out this method and producing the previously described pipe 10 is now generally described with reference to FIGS. 5 and 6. The wire embedding apparatus 60 includes an extruder 62 having an extrusion die head 64 that extrudes tubular plastic material 66 from an output end 68 thereof.

A wire feed device 70 receives a continuous length of wire 12 from a wire source 72 storing wire, such as a spindle of wire or the like. The wire feed device 70 deposits the wire 12 onto the extruded tubular plastic material 66.

A molding apparatus 74 receives the extruded tubular plastic material 66 and deposited wire 12 and molds the deposited wire 12 into the extruded tubular plastic material 66, forming a corrugated pipe 10 having a wire 12 embedded therein.

During the molding operation the wire 12 and extruded tubular material 66 move forwardly through the molding apparatus 74 along a longitudinal axis of the extruded tube in the direction in indicated by the arrow 76.

The corrugated pipe 10 may then be processed as desired for its intended use. For example, it may be cut to length, holes may be added, or slits may be added may be added. Optional post-processing steps for conventional corrugated pipes include those described are described in one or more of U.S. Pat. Nos. 3,916,763; 4,003,685, 3,919,367; 3,941, 639; 3,990,8273,910,713; 3,919,367; 3,877.831; 3,864,446; 3,784.346; 3,792,941; 3,799,418; 3,831,470; 3,843,758; 3,854,527; 3,870,774; and 3,891,733; Each of these patents is hereby incorporated by reference in its entirety.

Figure 6:
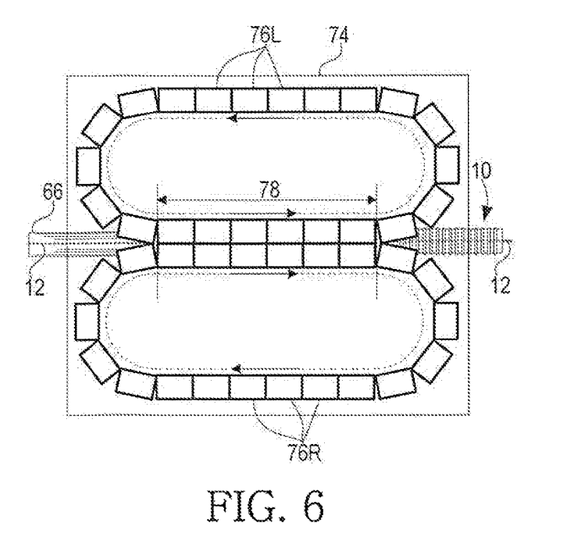
FIG. 6 is a diagram of a molding apparatus.

A molding apparatus 74 is shown in more detail in FIG. 6. The molding apparatus 74 includes a plurality of cooperating right handed 76R and left handed 76L mold members that continuously revolve in the direction shown by the arrows. Adjacent right handed mold members 76R and left handed mold members 76L are arranged end to end and move in two endless paths as shown.

The speed by which the right handed mold sections 76R and left handed mold members 76L move along their respective paths is substantially identically matched so that each pair of cooperating mold members 76R. 76L is in precise alignment and contiguous relation as they enter the molding zone 78 and move forwardly. The forward movement of the mold members 76R, 76L pulls the wire 12 from outside the molding zone 78 into the molding zone 78.

The cooperating mold members 76R, 76L include corrugated molding surfaces that form the corrugations on the pipe 10 as the extruded tubular material 66 moves through the molding zone 78. This, in turn, embeds the deposited wire 12 into the pipe body 14. The molding apparatus may use vacuum molding and/or blow molding in conjunction with the mold members 76R, 76L.

Figure 7:
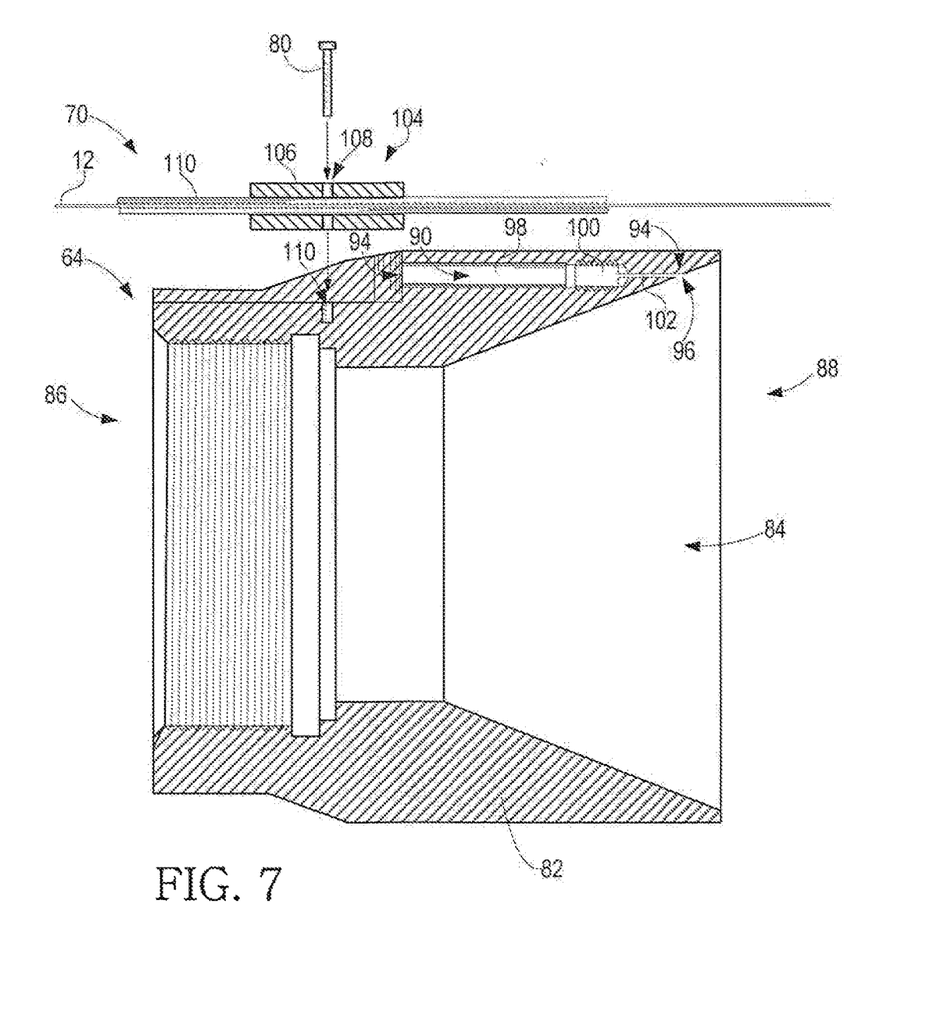
FIG. 7 is a cross-section of an extrusion die head with the wire feed device detached therefrom.
Figure 8:
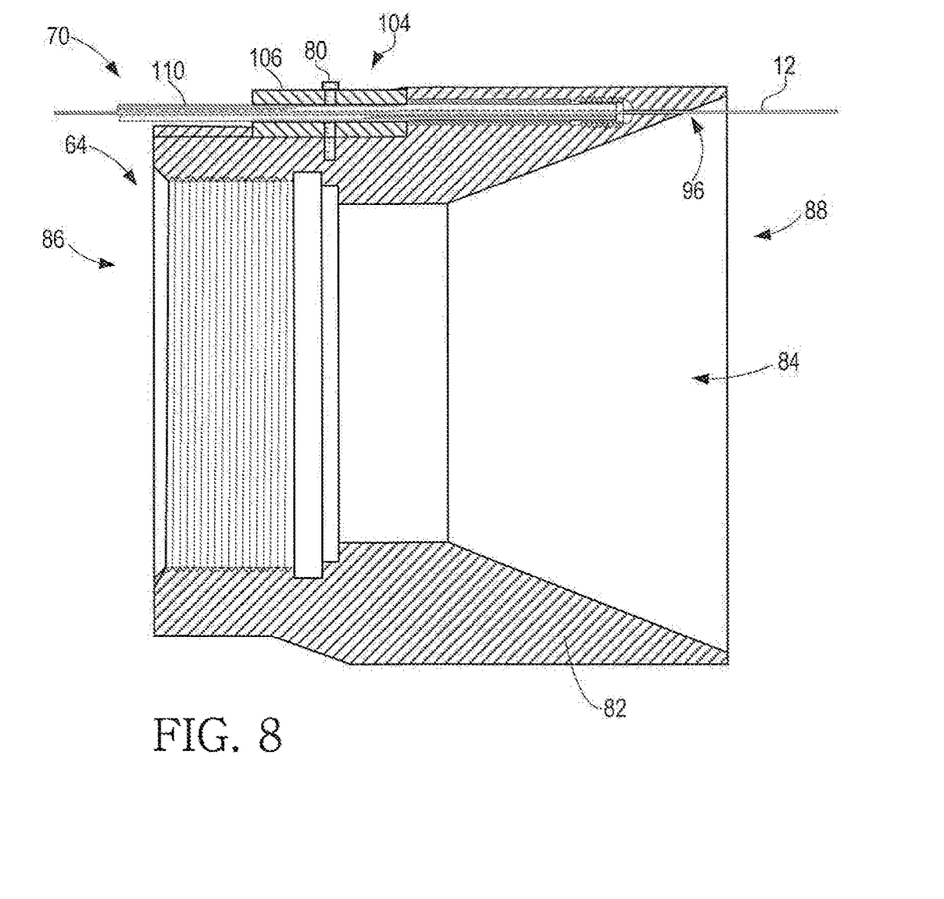
FIG. 8 is a cross-section of the extrusion die head of FIG. 7 with the wire feed device attached thereto.
Figure 9:
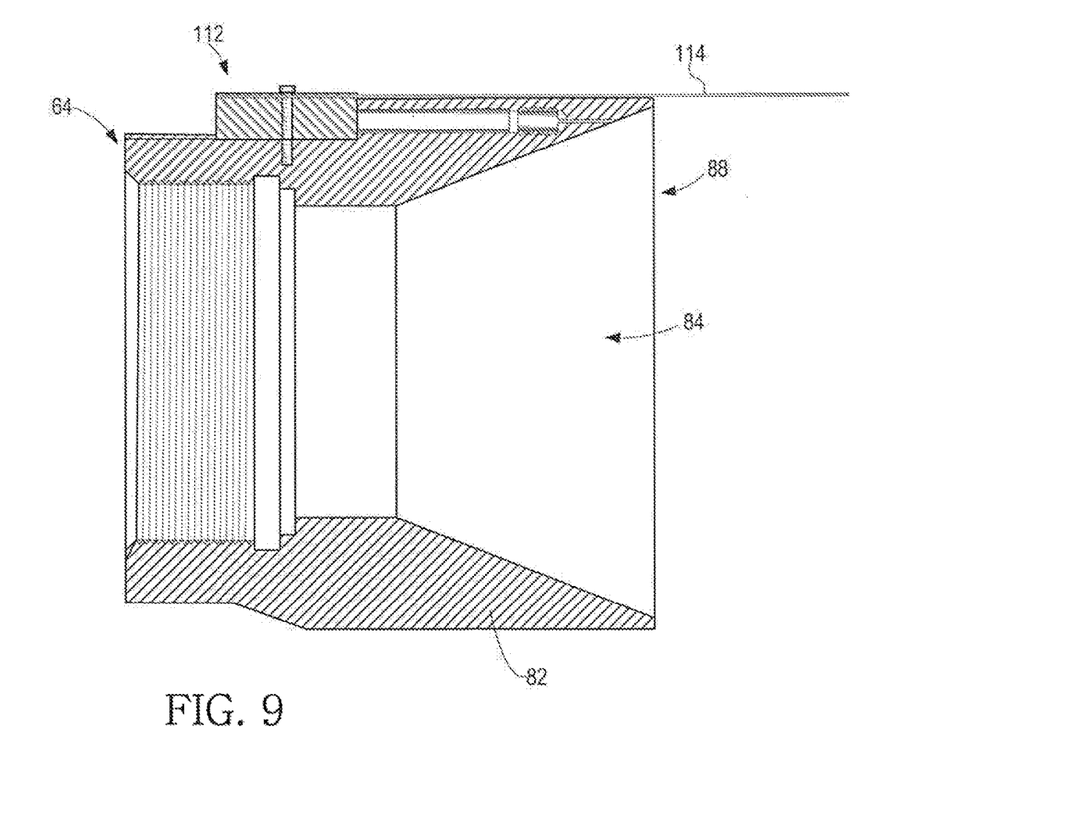
FIG. 9 is a cross-section of the extrusion die head of FIG. 7 with a rigid rod attached thereto.

The wire 12 is deposited on the extruded tubular material 66 using a unique extrusion die head 64, which is shown in FIGS. 7-9. FIG. 7, is an exploded view of the die head 64 and wire feed device 70. FIG. 8 shows the wire feed device 70 installed onto the die head 64 using a threaded fastener 80.

The die head 64 includes a hollow die body 82 defining an orifice 84 that extends between an input end 86 and an output end 88. In practice, the material to be extruded enters the input end 86 and the extruded tubular material 66 exits the output end 88. It is to be understood that the orifice 84 has a generally circular cross section.

The die body 82 includes a hollow shaft 90 extending in a generally co-axial direction with the orifice 84. The shaft 90 includes a first shaft end 92 and a second shaft end 94. The first shaft end 92 terminates in an opening 96 in the orifice 84 adjacent to the output end 88. The shaft 90 is divided into three sections: a first shaft section 98, a second shaft section 100, and a third shaft section 102. The first shaft section 98 is radially enlarged relative to the second 100 and third 102 shaft sections. The second shaft section 100 is radially enlarged relative to the third shaft section 102. When the shaft is not in use a plug may be inserted into the shaft 90 so that extruded material does not enter the opening 96.

The wire feed device 70 is modularly attachable to the die head 64 for feeding wire continuously through the shaft 90. The wire feed device 70 includes an attachment member 104 having a hollow attachment member body 106 with an opening 108 passing completely therethrough to allow a threaded fastener 80 to access a threaded opening 110 in the die body 82. The fastener 80 secures the attachment member 104 to the die body 82.

The attachment member body 106 defines a generally cylindrical interior wall (hidden) that forms a hollow passage therethrough. When the attachment member 104 is installed on the die body 82, the hollow passage provides wire access to the shaft 90.

A hollow tube 110 is positionable within the shaft 90 and hollow passage. The attachment member 104 secures the tube in place. The interior diameter of the tube 110 is sufficiently large to allow the wire 12 to be fed therethrough. The wire 12 is continuously drawn through the tube 110, allowing for long, continuous lengths of the pipe 10 to be made in a single production run.

In other embodiments, the die head 82 may include a plurality of wire feed devices 70 arranged radially about the orifice 84.

In some instances, it might be advantageous to form the ridge 38 on the interior of the pipe 10 without including the wire 12. This is because the ridge 38 itself, without the wire 12, actually increases the stiffness of the pipe 10. Conventionally, one would use single or double-walled corrugated pipe for applications in which improved stiffness is required. Unfortunately, however, single and double-walled corrugated pipe require much more raw material. The ridge 38 increases the stiffness of conventional corrugated pipe 10 without the need to move to single or double-walled pipe.

Referring to FIG. 9, a modified attachment member 112 is shown secured to the die body 82 in the same manner. A rigid rod 114, preferably made of metal, extends forwardly out of the attachment member 112 in the direction of, and continues beyond, the output end 88. In practice, the rod 114 deforms the pipe body 14 in the same manner as the wire 12 while the pipe is being molded, thereby creating the ridge 38 in the pipe body 14, but without the wire 12 being embedded therein. Additional modified attachment members 112 may be arranged radially about the orifice 84 to form additional ridges 38.

Various modifications of the embodiments described here can be made without departing from the spirit and scope of the invention as described above and as claimed.

That which is claimed is:

1. A method of embedding wire in corrugated pipe, the method comprising:
   introducing an extruded tube of resilient material into a molding apparatus having a plurality of cooperating mold members;
   inserting electrically conductive wire into the molding apparatus while introducing the extruded tube into the molding apparatus;
   molding corrugations into the extruded tube while embedding the wire into the resilient material by contacting the tube and wire with the mold members, thereby forming a corrugated pipe with the wire embedded in a corrugated body thereof.

2. The method of claim 1, wherein the wire and extruded tube move forwardly through the molding apparatus along a longitudinal axis of the extruded tube and at substantially the same speed.

3. The method of claim 1, wherein the plurality of cooperating mold members are forwardly moving and the forward movement of the mold members pulls the wire from outside the molding apparatus into the molding apparatus.

4. The method of claim 1, wherein:
   the corrugated pipe comprises a corrugated pipe body circumscribing a hollow conduit and including alternating ribs and valleys extending along a longitudinal axis between an open first end and an open second end thereof; and
   the wire is embedded in the corrugated pipe body so as to span adjacent ribs and valleys and extend substantially parallel to the longitudinal axis between the open first and second ends of the corrugated pipe body.

5. The method of claim 4, wherein the valleys of the adjacent ribs and valleys have a valley floor and the wire is embedded in adjacent valley floors.

6. The method of claim 4, wherein the valleys of the adjacent ribs and valleys have a valley floor and the wire is embedded in a ridge of the material forming the corrugated pipe body, the ridge spanning adjacent valley floors.

7. The method of claim 6, wherein the ridge spans adjacent valley floors along an interior surface of the corrugated pipe body.

8. The method of claim 4, wherein the wire is cylindrical and has a cylindrical axis that extends substantially parallel to the longitudinal axis between the open first and second ends.

9. A wire embedding system comprising:
   an extruder having an extrusion die head that extrudes tubular material from an output end thereof;
   a wire feed device including a hollow shaft that receives a continuous length of wire, feeds the wire through the shaft to an opening in the shaft adjacent the output end, deposits the wire from the opening onto the extruded tubular material; and
   a molding apparatus that receives the extruded tubular material together with the deposited wire and molds the deposited wire into the extruded tubular material.

10. The wire embedding system of claim 9, wherein the molding apparatus embeds the deposited wire into the extruded tubular material while simultaneously pulling the extruded tubular material and wire from the extruder.

11. The wire embedding system of claim 9, wherein the extrusion die head includes a hollow body defining an orifice that extends from an input end to the output end and the opening in the shaft of the wire feed device is positioned within the orifice.

12. The wire embedding system of claim 9, wherein the molding apparatus molds the extruded tubular material into a corrugated pipe having a corrugated pipe body circumscribing a hollow conduit and including alternating ribs and valleys extending along a longitudinal axis of the hollow conduit between a first end and a second end of the corrugated pipe body.

13. The wire embedding system of claim 12, wherein the valleys of the adjacent ribs and valleys have a valley floor and the wire is embedded in adjacent valley floors.

14. The wire embedding system of claim 12, wherein the valleys of the adjacent ribs and valleys have a valley floor and the wire is embedded in a ridge of the material forming the corrugated pipe body, the ridge spanning adjacent valley floors.

15. The wire embedding system of claim 12, wherein a ridge spans adjacent valley floors along an interior surface of the corrugated pipe body.

16. The wire embedding system of claim 12, wherein the wire is cylindrical and has a cylindrical axis that extends substantially parallel to the longitudinal axis between the first and second ends.

* * * * *